Nov. 11, 1930.   I. E. COFFEY   1,781,270
GEAR SHIFTING MECHANISM
Filed Oct. 6, 1922   2 Sheets-Sheet 1
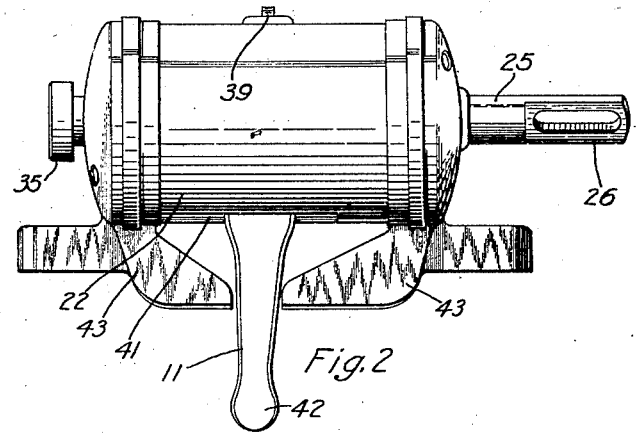
Fig. 2
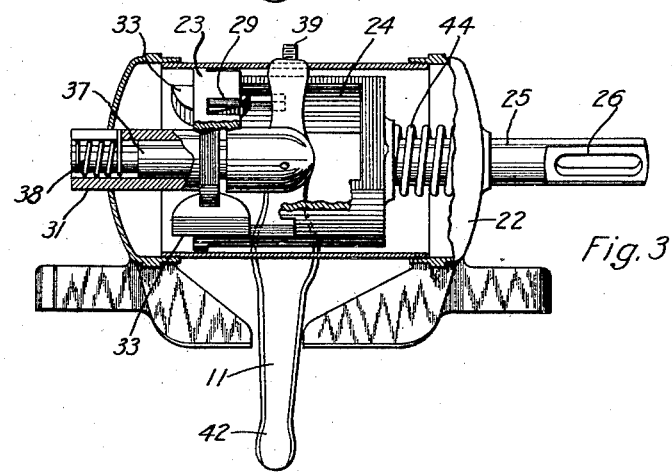
Fig. 3
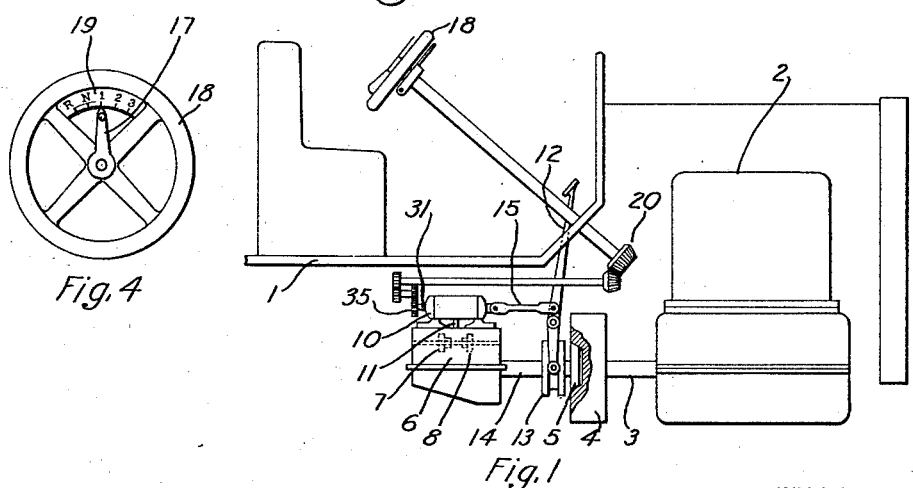
Fig. 4
Fig. 1
WITNESSES:
Fred C. Wilhelm
J. R. Langley
INVENTOR
Irven E. Coffey
BY
Wesley G. Carr
ATTORNEY Nov. 11, 1930.   I. E. COFFEY   1,781,270
GEAR SHIFTING MECHANISM
Filed Oct. 6, 1922   2 Sheets-Sheet 2

WITNESSES:
Fred. L. Wilharm
J. R. Langley.

INVENTOR
Irven E. Coffey
BY
Wesley G. Carr
ATTORNEY

Patented Nov. 11, 1930

1,781,270

UNITED STATES PATENT OFFICE

IRVEN E. COFFEY, OF HASTINGS, NEBRASKA

GEAR-SHIFTING MECHANISM

Application filed October 6, 1922. Serial No. 592,770.

My invention relates to gear-shifting mechanisms and it has particular relation to mechanical gear-shifting mechanisms of the preselective type.

One object of my invention is to provide a gear-shifting mechanism that is interchangeable with the usual manually operable shifting lever.

A second object of my invention is to provide a gear-shifting mechanism that embodies a single shifting member for coacting with the shiftable elements of transmission mechanisms.

Another object of my invention is to provide means whereby a shifting member may be actuated in opposite directions to the one or the other of a plurality of positions in each direction.

A further object of my invention is to provide a gear-shifting mechanism of simple and inexpensive construction for automatically varying the speed ratio of a transmission mechanism upon the operation of the clutch pedal of a motor vehicle subsequent to the adjustment of a selector device.

In the application of gear-shifting mechanisms, as heretofore constructed, to the transmission mechanisms of motor vehicles, it has been necessary to provide special means for connecting the coacting mechanisms. In case of failure of the gear-shifting mechanism to function properly, it has been difficult and, in some cases, impossible to operate the transmission mechanism by manually operable means.

According to the present invention, I provide a gear-shifting mechanism having a single shifting member which is adapted to replace the usual manually operable shifting lever of the ball-and-socket type. The gear-shifting mechanism may, accordingly, be applied without change or modification of the transmission.

In the accompanying drawings,

Fig. 1 is a view, in side elevation, of a portion of an automobile with my invention applied thereto;

Fig. 2 is a view, in side elevation, of a gear-shifting mechanism embodying my invention;

Fig. 3 is a view, partially in longitudinal section and partially in elevation, of the mechanism of Fig. 1, parts being broken away;

Fig. 4 is a plan view of a steering wheel with a selector mechanism mounted thereon;

Figure 5:
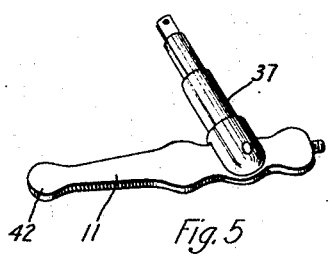
Fig. 5 is a detail perspective view of the shifting member and a connected part.

Referring particularly to Fig. 1, an automobile, only a portion of which is shown, comprises a body portion 1, an engine 2 having a shaft 3, a fly-wheel 4, a clutch 5 coacting with the fly-wheel and a transmission mechanism 6 that is operatively connected to the clutch 5.

The transmission 6 is of the usual type, embodying two elements 7 and 8 each of which is shiftable in opposite directions from a neutral position to operative positions corresponding to different speed ratios. The transmission may, accordingly, be adjusted for five conditions of operation: reverse, neutral, and first, second and third speeds.

The positions of the shiftable elements are controlled by a gear-shifting mechanism 10 which is mounted upon the transmission mechanism and is operatively connected thereto by means of a shifting member 11. The clutch 5 and the gear-shifting mechanism 10 are both actuated by the usual clutch-pedal lever 12 that is operatively connected to a grooved sleeve member 13 on the transmission shaft 14 and by means of a link 15 to the gear-shifting mechanism 10.

The gear-shifting mechanism 10 is controlled by a selector mechanism comprising an indicating lever 17 (Fig. 4) that is mounted on the steering wheel 18 and a quadrant 19 having legends for indicating the positions to which the transmission mechanism 6 is to be adjusted for a desired speed ratio. The lever 17 is operatively connected to the gear-shifting mechanism 10 by means of a train of gear wheels 20.

Figure 6:
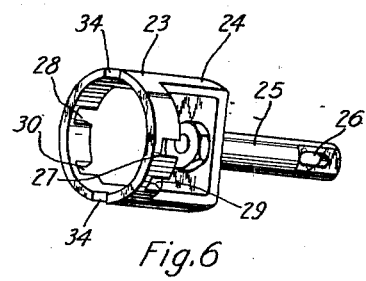
Fig. 6 is a view, similar to Fig. 5, of the actuating member.
Figure 8:
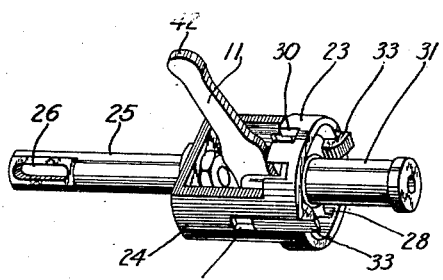
Fig. 8 is a perspective view of the operating mechanism in assembled relation.

Referring particularly to Figs. 2 and 3, a cylindrical casing member 22 rotatably supports an annular actuating member 23, best shown in Figs. 6 and 8, that is provided with a yoke 24 to which is rotatably connected a rod 25. The rod 25 has a slotted end portion 26 to provide a lost-motion connection to the link 15. The member 23 is provided with a series of recesses or notches 27, 28, 29 and 30, for a purpose to be hereinafter described.

Figure 7:
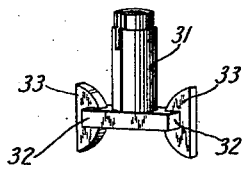
Fig. 7 is a view, similar to Fig. 5, of a portion of the selector mechanism.

The angular position of the actuating member 23 is controlled by a hollow shaft 31 (Figs. 3, 7 and 8) that is provided with oppositely-extending arms 32 each of which bears an outwardly-extending key 33 which coacts with a corresponding slot 34 in the actuating member 23. The shaft 31, which extends through an axial opening in the casing 22, is provided, at its outer end, with a gear wheel 35 or other suitable device, by means of which it is connected to the gear wheels 20.

Figure 9:
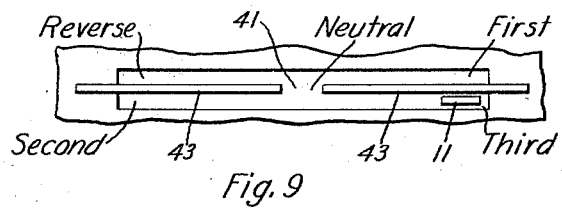
Fig. 9 is a diagrammatic view of the path of movement of the shifting member.

The shifting member 11, which is a vertically-extending bar, is pivotally mounted in a slot in one end of a short shaft 37 that is rotatably mounted in the bore of the hollow shaft 31. The shafts 31 and 37 are connected by a spring 38 which tends to maintain the shafts and their connected parts in the same relative angular positions. The upper end portion of the member 11 is provided with a threaded stud 39 to which may be secured a manually operable lever (not shown) in case of emergency. The lower portion of the shifting member 11, which projects through a slot 41 in the casing 22, is provided with a knob 42 for engaging the usual slotted members (not shown) that are respectively connected to each of the shiftable gear wheels 7 and 8. The slot 41 and two guide members 43 that extend in a plane which substantially bisects the slot 41, constitute means whereby the path of movement of the shifting member 11 is substantially H-shape, corresponding to the well-known H-gate of certain forms of manually-operable gear-shifting devices. This path of movement is diagrammatically shown in Fig. 9.

It may be assumed that the engine 2 is running and that the transmission mechanism 6 is in its neutral position. It may be assumed further that it is desired to shift to first speed. Accordingly, the lever 17, or indicator, is actuated to the position designated 1, as illustrated in Fig. 4, to correspondingly adjust the angular position of the actuating member 23, and, through the spring 38 and shaft 37, to move the shifting member 11 laterally between the ends of the guide members 43 to the corresponding side of the slot 41.

The clutch pedal is then actuated forwardly to first disengage the clutch 5 and then, when the end of the lost-motion connection to the gear-shifting mechanism is reached, to actuate the rod 25 and the actuating member 23 to the right, as viewed in Figs. 1, 2 and 3, against the force of a spring 44. The lower portion of the actuating member engages the shifting member 11 below its point of pivotal support while the upper portion of the shifting member 11 registers with the notch 27. Accordingly, the shifting member 11 is actuated about its point of pivotal support in a counter-clockwise direction, as viewed in Fig. 3, to shift the gear wheel 7 into position for first-speed operation. The clutch pedal 12 is then released to first permit the spring 44 to return the actuating member 23 and rod 25 to their normal longitudinal positions. The lost-motion connection between the rod 25 and the link 15 permits the clutch 5 to be returned to its operative position after the several parts of the gear-shifting mechanism are returned to their respective normal positions.

To shift from first speed to second speed, the selector lever is adjusted to the numeral 2 at any time before the actual change is effected. The angular position of the actuating member 23 is adjusted to produce the desired change, and the spring 38 is placed under stress to tend to actuate the shifting member 11 through the opening between the guides 43 to the other side of the slot 41. As previously described, the clutch is first disengaged and the actuating member is then actuated to the right to engage the shifting member 11. None of the notches register with the member 11 and the latter is accordingly actuated in a clockwise direction to a vertical position to return the gear wheel 7 to its neutral position. When the shifting member 11 is opposite the opening between the guides 43, the spring 38 quickly actuates it laterally through the opening, whereupon it registers with the notch 28. Accordingly, the shifting member, which now engages gear wheel 8, is rotated in the same direction to effect connections for operation at second speed. The actuating member 23 and its connected parts are returned and the clutch engaged, as described above.

When the lever is adjusted for third speed, the notch 29 registers with the shifting member 11. Actuation of the clutch pedal then successively disengages the clutch, actuates the shifting member 11 in a counter-clockwise direction to shift the gear wheel 8 from second-speed position, through its neutral position, to third-speed position, with a continuous movement.

To secure reverse operation, the lever 17 is adjusted to R. If the one or the other of the gear wheels 7 and 8 is in operative position, the actuation of the clutch pedal successively effects the disengagement of the clutch, returns the gear wheel to neutral position, and, if the shifting member is on the opposite side of the slot 41, it is actuated between the guides 43 to register with the notch 30. Further actuation of the pedal effects movement of the shifting member 11 in a clockwise direction to shift the gear wheel 7 into position for reverse operation.

When the lever is at N and the pedal 12 is actuated, the shifting member 11 is returned to its neutral position from any operative position and it is not actuated therefrom because it does not register with any of the notches in the actuating member.

The notches of the actuating member 23 are so located that the shifting member 11 is always returned to neutral from any operative position if the selector mechanism is adjusted for any other position. However, the actuation of the clutch pedal to its extreme position does not change the position of the gear wheel that is in operative position if the selector lever indicates that position.

My improved gear-shifting mechanism operates to secure any speed ratio desired, regardless of the ratio at which the transmission mechanism may be operating previously. The selector mechanism may be adjusted at any time in advance of the actual change to the new speed ratio.

I claim as my invention:

1. In a gear-shifting mechanism, the combination with a plurality of shiftable elements for securing more than two speed ratios and a member that is mounted for axial and angular movements, said member having a plurality of recesses in one face thereof, of a member pivotally supported at its mid-portion and adjacent to the axis of the recessed member for movement in the one or the other direction about its pivotal support to select any of said speed ratios when it is engaged by the recessed member according as a recess registers with the one or the other end of the second-named member.

2. In a gear-shifting mechanism, the combination with a plurality of shiftable elements for reverse operation and a plurality of forward speed ratios and a member that is mounted for axial and angular movements, said member having a plurality of recesses in one face thereof, of a member pivotally supported at its mid-portion and adjacent to the axis of the recessed member for movement in the one or the other direction about its pivotal support to select any of said speed ratios when it is engaged by the recessed member according as a recess registers with the one or the other end of the second-named member, and means for guiding the movement of said pivotally-supported member.

3. In a gear-shifting mechanism, the combination with a member that is mounted for axial and angular movements, said member having a plurality of recesses in one face thereof, of a member pivotally supported at its mid-portion and adjacent to the axis of the recessed member for movement in the one or the other direction in a plurality of planes about its pivotal support when it is engaged by the recessed member according as a recess registers with the one or the other end of the second-named member, and guiding means of substantially H-shape for limiting the paths of movement of said pivotally-supported member 4. In a gear-shifting mechanism, the combination with an angularly adjustable member having a plurality of recesses, a pivotally-supported member coacting with said adjustable member and adapted to be actuated about its pivotal support thereby in the one or the other direction according as the latter member is engaged at the one or the other of its ends by other than a recessed portion of the adjustable member, and means for actuating said pivotally-supported member in a plane transverse to that of its pivotal movement.

5. In a gear-shifting mechanism, the combination with a single shifting member, and guiding means therefor of substantially H-shape, of means for preselecting the operative position of said shifting member, manually operable means that is movable in a single direction for actuating said member in either direction along the parallel portions of said guiding means, and additional means for actuating said member transversely to said parallel portions.

6. In a gear-shifting mechanism, the combination with an annular member having recesses in one face thereof, and means for supporting said member for axial and for angular movements, of means for selectively adjusting the angular position of said member, means for actuating said member longitudinally, a shifting member actuated by said annular member in one of a plurality of parallel paths of movement, and means controlled by said adjusting means for determining a portion of the path of said shifting member.

7. In a gear-shifting mechanism, the combination with an annular member having recesses in one face thereof, and means for supporting said member for axial and for angular movements, of means for selectively adjusting the angular position of said member, means for actuating said member longitudinally, a shifting member actuated by said annular member in one of a plurality of parallel paths of movement, and means controlled by said adjusting means for biasing the shifting member to the one or the other of said parallel paths.

In testimony whereof, I have hereunto subscribed my name this 29th day of September, 1922.

IRVEN E. COFFEY.